US012801949B2

(12) United States Patent

Chang et al.

(10) Patent No.: US 12,801,949 B2

(45) Date of Patent: Nov. 17, 2026

(54) METHOD AND SYSTEM FOR ADAPTIVELY DEPLOYING INFERENCE MODEL ON AN EDGE DEVICE

(71) Applicant: PEGATRON CORPORATION, Taipei City (TW)

(72) Inventors: Shen-Hau Chang, Taipei City (TW); Chieh-Hsuan Cheng, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 1021 days.

(21) Appl. No.: 18/073,372

(22) Filed: Dec. 1, 2022

(65) Prior Publication Data

US 2023/0267344 A1 Aug. 24, 2023

(30) Foreign Application Priority Data

Feb. 24, 2022 (TW) ................................. 111106721

(51) Int. Cl.

*G06N 5/04* (2023.01)

*G06F 8/60* (2018.01)

(52) U.S. Cl.

CPC ................ *G06N 5/04* (2013.01); *G06F 8/60* (2013.01)

(58) Field of Classification Search

None

See application file for complete search history.

(56) References Cited

U.S. PATENT DOCUMENTS

2020/0336566 A1* 10/2020 Yassin ................. G06F 11/3006

2020/0356415 A1* 11/2020 Goli ....................... G06N 20/00

FOREIGN PATENT DOCUMENTS

| | | |
|---|---|---|
| CN | 109120674 | 1/2019 |
| CN | 111373366 | 7/2020 |
| CN | 111459505 | 7/2020 |
| CN | 113377464 A | 10/2021 |
| WO | 2019103999 | 5/2019 |

OTHER PUBLICATIONS

"Examination report of India counterpart Application", issued on Sep. 24, 2025, p. 1-p. 6.

* cited by examiner

*Primary Examiner* — Eric C Wai

(74) *Attorney, Agent, or Firm* — J.C. PATENTS

(57) ABSTRACT

The disclosure provides a method and a system for deploying an inference model. The method includes: obtaining an estimated resource usage of each of a plurality of model settings of the inference model; obtaining a production requirement; selecting one of the plurality of model settings as a specific model setting based on the production requirement, a device specification of an edge computing device, and the estimated resource usage of each of the model settings; and deploying the inference model configured with the specific model setting to the edge computing device.

15 Claims, 3 Drawing Sheets

METHOD AND SYSTEM FOR ADAPTIVELY DEPLOYING INFERENCE MODEL ON AN EDGE DEVICE

CROSS-REFERENCE TO RELATED APPLICATION

This application claims the priority benefit of Taiwan application serial no. 111106721, filed on Feb. 24, 2022. The entirety of the above-mentioned patent application is hereby incorporated by reference herein and made a part of this specification.

BACKGROUND

Technical Field

The disclosure relates to a mechanism for deploying a model, and in particular, to a method and a system for deploying an inference model.

Description of Related Art

In applications related to deep learning, if the production line of a factory needs an inference computer with edge computing capabilities, inference models may be deployed to the corresponding inference computer. If there are a plurality of models that need to run on a single inference computer at the same time, the relevant manager needs to manually calculate how many models the inference computer may support to run at the same time, and then deploy the models to each of the inference computers accordingly.

The issue with this approach is that the factory's demand for inference computers varies for different products and applications, and the inference computers that factories purchase are also not the same.

In general, inference computers used to perform edge computing do not necessarily have the same hardware specifications or requirements. Moreover, for some products with less demand, the products may not be handled by a single inference computer, but share the same inference computer with other products.

SUMMARY

Accordingly, the disclosure provides a method and a system for deploying an inference model that may be used to solve the above technical issues.

The disclosure provides a system for deploying an inference model, including an edge computing device and a model management server. The model management server is configured to: obtain an estimated resource usage of each of a plurality of model settings of the inference model; obtain a production requirement; select one of the plurality of model settings as a specific model setting based on the production requirement, a device specification of the edge computing device, and the estimated resource usage of each of the model settings; and deploy the inference model configured with the specific model setting to the edge computing device.

The disclosure provides a method for deploying an inference model, including: obtaining an estimated resource usage of each of a plurality of model settings of the inference model; obtaining a production requirement; selecting one of the plurality of model settings as a specific model setting based on the production requirement, a device specification of an edge computing device, and the estimated resource usage of each of the model settings; and deploying the inference model configured with the specific model setting to the edge computing device.

Therefore, compared with the conventional manual evaluation method, the method of an embodiment of the disclosure may more accurately evaluate the inference model suitable for deployment to the edge computing device.

DESCRIPTION OF THE EMBODIMENTS

Figure 1:
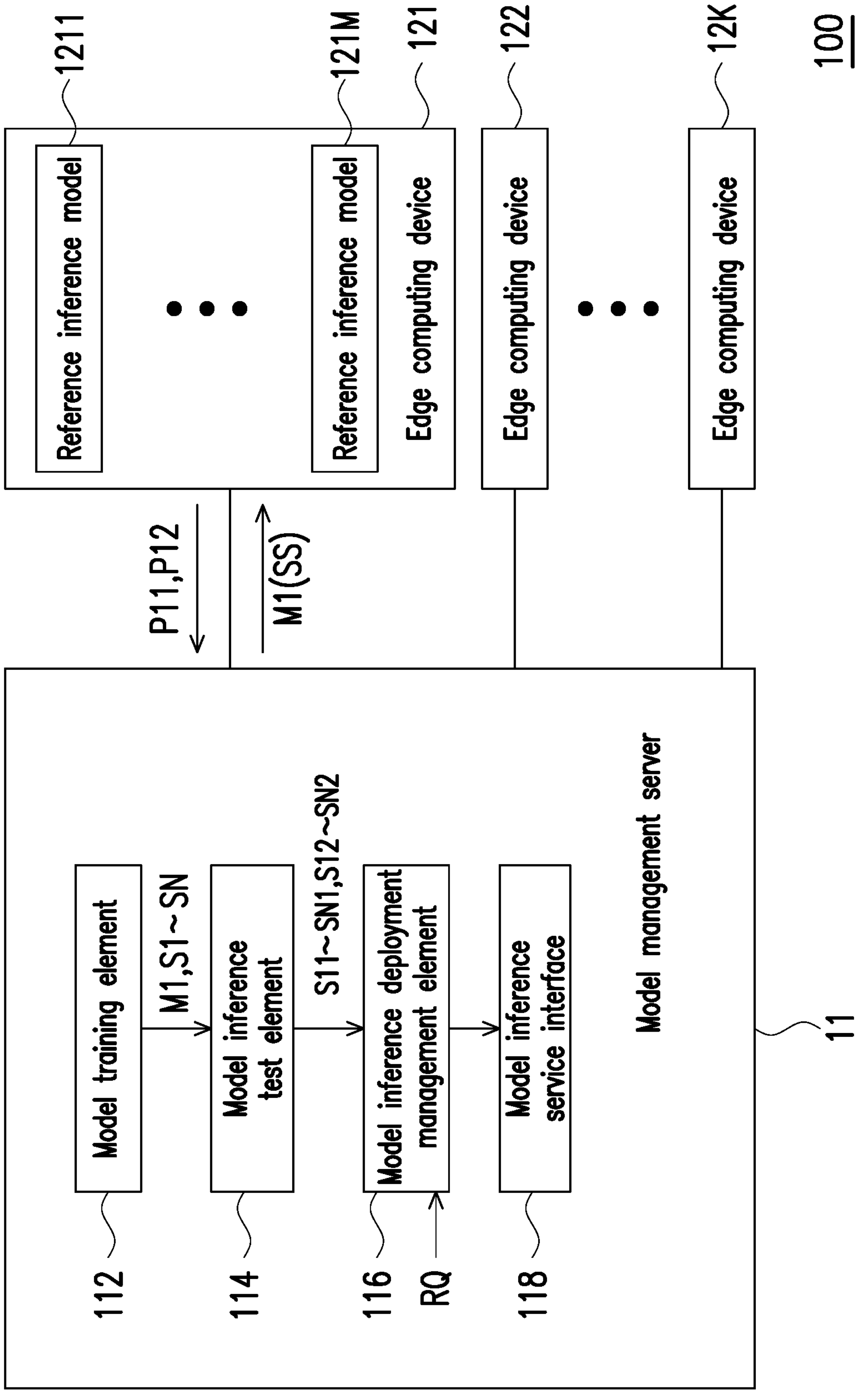
FIG. 1 is a schematic diagram of a system for deploying an inference model shown according to an embodiment of the disclosure.

FIG. 1 is a schematic diagram of a system for deploying an inference model shown according to an embodiment of the disclosure. In FIG. 1, a system 100 for deploying an inference model includes a model management server 11 and at least one edge computing device 121 to 12K, wherein K is a positive integer. In an embodiment of the disclosure, each of the edge computing devices 121 to 12K is, for example, an inference computer having edge computing capability, and may be disposed in the same or different fields (e.g., factories, etc.) and controlled by the model management server 11. In different embodiments, the edge computing devices 121 to 12K may be implemented as various smart devices and/or computer devices, but the disclosure is not limited thereto.

In an embodiment, each of the edge computing devices 121 to 12K may be deployed with one or a plurality of corresponding reference inference models, so as to implement corresponding inference/prediction functions.

For example, the edge computing device 121 may be deployed with reference inference models 1211 to 121M (M is a positive integer), and each of the reference inference models 1211 to 121M may have corresponding inference/prediction functions, such as screen defect detection, etc., but the disclosure may not be limited thereto.

In FIG. 1, the model management server 11 includes a model training element 112, a model inference test element 114, a model inference deployment management element 116, and a model inference service interface 118, in which the model training element 112 is coupled to the model inference test element 114, and the model inference deployment management element 116 is coupled to the model inference test element 114 and the model inference service interface 118.

Figure 2:
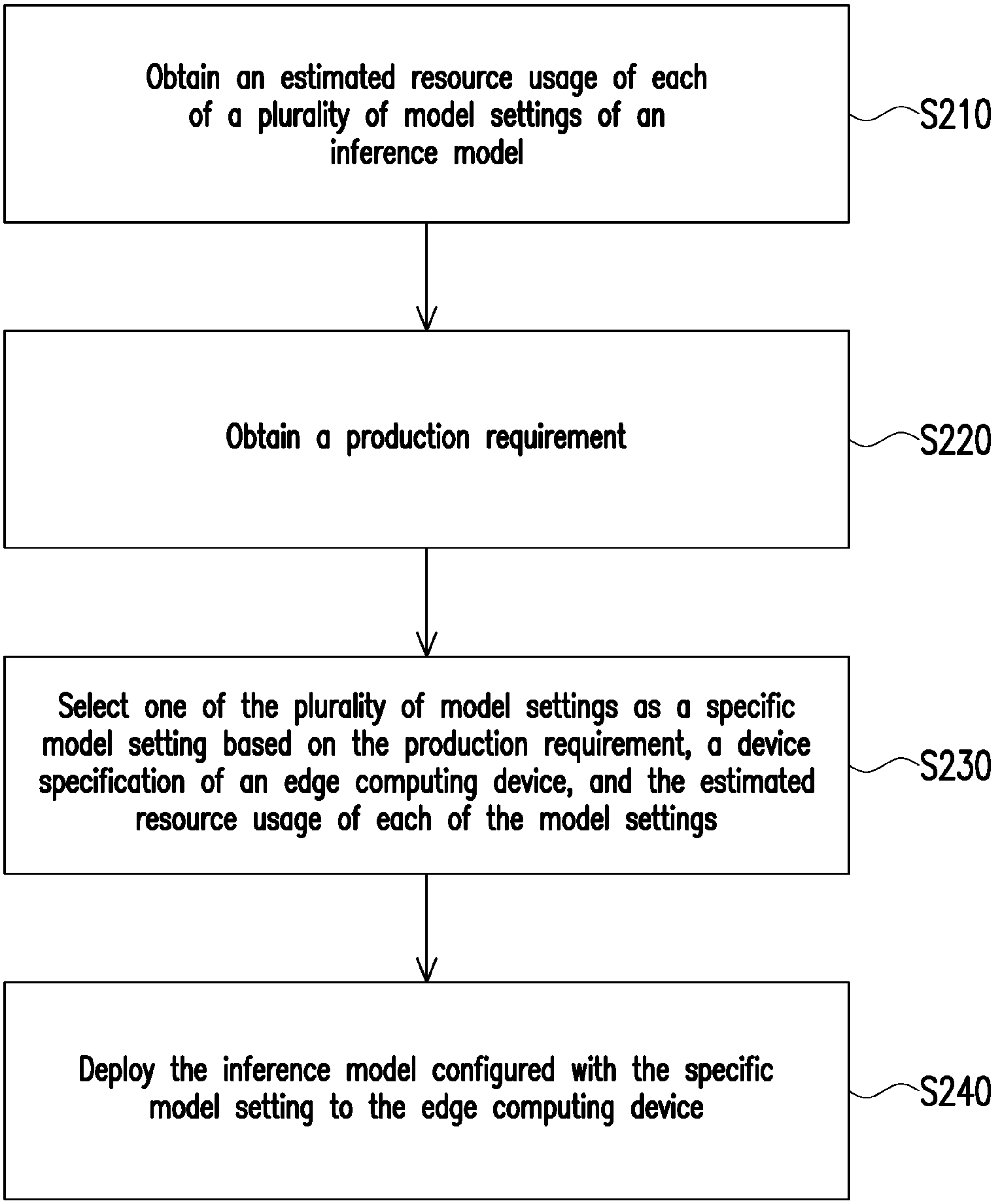
FIG. 2 is a flowchart of a method for deploying an inference model shown according to an embodiment of the disclosure.

FIG. 2 is a flowchart of a method for deploying an inference model shown according to an embodiment of the disclosure. The method of the present embodiment may be performed by the model management server 11 of FIG. 1, and the details of each step of FIG. 2 are described below with the elements shown in FIG. 1.

First, in step S210, the model management server 11 obtains the estimated resource usage of each of a plurality of model settings of an inference model M1.

In an embodiment, the inference model M1 is, for example, an inference model to be deployed to one or a plurality of edge computing devices among the edge computing devices 121 to 12K. For the ease of description, it is assumed that the considered edge computing device to be deployed is the edge computing device 121, but the disclosure may not be limited thereto.

In an embodiment of the disclosure, the model training element 112 may be used to train a plurality of inference models including the inference model M1, and may publish the weights of each of the trained inference models and the corresponding plurality of model settings to the model inference test element 114.

In an embodiment, the model inference test element 114 applies the trained inference model M1 to corresponding model settings to perform a pre-inference operation corresponding to each of the model settings, so as to obtain the estimated resource usage of each of the model settings. In addition, in an embodiment, when the model inference test element 114 performs the above pre-inference operation corresponding to each of the model settings, the estimated model performance of each of the model settings may also be obtained.

In an embodiment, the inference test element 114 may have its own test specification, and the test specification includes, for example, a reference processor clock and a reference floating-point operations per second (FLOPS). For the ease of description, the reference processor clock and the reference number of FLOPS are represented by $Clock_{test}$ and $FLOPS_{test}$, respectively. Based on this, the inference test element 114 may perform the above pre-inference operation with its own test specification.

For example, assuming that the inference model M1 has N (N is a positive integer) model settings S1 to SN in total, the inference test element 114 applies the trained inference model M1 to the N model settings S1 to SN individually, so as to obtain estimated resource usages S11 to SN1 and estimated model performances S12 to SN2 of each of the N model settings S1 to SN.

For example, the inference test element 114 may apply the inference model M1 configured with the model setting S1 to perform pre-inference operations (e.g., screen defect detection), so as to obtain the estimated resource usage S11 and the estimated model performance S12 of the corresponding model setting S1.

Each of the model settings S1 to SN of the inference model M1 may include, for example, GPU model, model format, data type, batch information, and the like. In an embodiment, the N model settings S1 to SN of the inference model M1 may be illustrated in Table 1 below.

TABLE 1

| Model setting | GPU model | Model format | Data type | Bulk information |
|---|---|---|---|---|
| S1 | P100 | ONNX | FLOAT16 | 8 |
| S2 | P100 | Darknet | FLOAT16 | 64 |
| . . . | . . . | . . . | . . . | . . . |
| SN | P200 | Torch | FLOAT32 | 128 |

In an embodiment, the estimated resource usage of each of the model settings of the inference model M1 includes at least one of an estimated cycle time and an estimated image memory usage. Moreover, the estimated model performance of each of the model settings of the inference model M1 includes at least one of estimated accuracy, mean average precision (mAP), and recalling rate.

For example, the estimated resource usage S11 of the model setting S1 may include the estimated cycle time and the estimated image memory usage corresponding to the inference model M1 adopting the model setting S1. Moreover, the estimated model performance S12 of the model setting S1 may include the estimated accuracy, mean average precision, and recalling rate corresponding to the inference model M1 of the model setting S1.

In an embodiment, the individual estimated resource usage and estimated model performance of the N model settings of the inference model M1 as shown in Table 2 below.

TABLE 2

| Model setting | Estimated accuracy | mAP | Recalling rate | Estimated cycle time | Estimated image memory usage |
|---|---|---|---|---|---|
| S1 | 0.9 | 0.44 | 0.2 | 6.978 ms | 1.44 GB |
| S2 | 0.87 | 0.57 | 0.4 | 5.259 ms | 3.79 GB |
| . . . | . . . | . . . | . . . | . . . | . . . |
| SN | 0.93 | 0.67 | 0.37 | 5.172 ms | 6.48 GB |

In step S220, the model management server 11 obtains a production requirement RQ. In an embodiment, the model management server 11 may obtain the production requirement RQ via the model inference deployment management element 116, for example. In an embodiment, the model inference deployment management element 116 may query a production management system to obtain the production requirement RQ, for example. In an embodiment, the production requirement RQ is at least one of, but not limited to, the unit per hour (UPH) of a certain product and the number of pictures per unit.

In an embodiment, assuming that the inference model M1 is used to produce a product in a certain project, the model inference deployment management element 116 may query for the production requirement RQ (such as the UPH and the number of pictures per unit) of this project in the production management system according to the name and/or the work order number of the project, for example, but the disclosure is not limited thereto.

In an embodiment of the disclosure, the model management server 11 may request one or a plurality of the edge computing devices 121 to 12K to provide corresponding device specification and resource usage, and accordingly evaluate whether the edge computing devices are suitable to be deployed with the inference model M1. For ease of description, the following takes the edge computing device 121 in the edge computing devices 121 to 12K as an example for description, and those having ordinary skill in the art should be able to know the operations performed by the model management server 11 may be performed on other edge computing devices, but the disclosure may not be limited thereto.

In an embodiment, the model management server 11 obtains the device specification and resource usage of the edge computing device 121. In an embodiment, the model management server 11 may obtain a device specification P11 and a resource usage P12 of the edge computing device 121 via the model inference deployment management element 116. In an embodiment, the model inference deployment management element 116 may request the edge computing device 121 to report the device specification P11 and the resource usage P12 to the model management server 11, but the disclosure may not be limited thereto.

In an embodiment, the device specification P11 of the edge computing device 121 includes, for example, at least one of total memory space size (represented by $RAM_{total}$), image memory space size (represented by $GRAM_{total}$), processor clock (represented by $Clock_{edge}$), and number of floating point operations per second of the image processing unit (represented by $FLOPS_{edge}$) of the edge computing device 121. For ease of description, it is assumed that the device specification P11 of the edge computing device 121 is exemplified in Table 3 below.

TABLE 3

| | $RAM_{total}$ | $GRAM_{total}$ | $Clock_{edge}$ | $FLOPS_{edge}$ |
|---|---|---|---|---|
| Device specification P11 | 32 GB | 16 GB | 3.9 GHZ | 9.3T |

In an embodiment, the resource usage P12 of the edge computing device 121 includes, for example, current memory usage (represented by $RAM_{used}$), current image memory usage (represented by $GRAM_{used}$), and idle time (represented by Idle_Time) of each of the reference inference models 1211 to 121M. For example, $RAM_{used}$ of each of the reference inference models 1211 to 121M represents the space occupied by each of the reference inference models 1211 to 121M in the memory of the edge computing device 121 at present. For example, $GRAM_{used}$ of each of the reference inference models 1211 to 121M represents the space occupied by each of the reference inference models 1211 to 121M in the image memory of the edge computing device 121 at present. The idle time of each of the reference inference models 1211 to 121M is, for example, the time when each of the reference inference models 1211 to 121M is not used for inference/prediction/identification. In an embodiment, the resource usage P12 of the edge computing device 121 may be exemplified in Table 4 below.

TABLE 4

| Reference inference model | $RAM_{used}$ | $GRAM_{used}$ | Idle_Time |
|---|---|---|---|
| 1211 | 0.986 GB | 3.79 GB | 0.5 s |
| . . . | . . . | . . . | . . . |
| 121M | 1.1 GB | 6.48 GB | 7 days |

In step S230, the model management server 11 selects one of the plurality of model settings S1 to SN as the specific model setting SS based on the production requirement RQ, the device specification of the edge computing device 121, and the estimated resource usages S11 to SN1 of each of the model settings S1 to SN.

In an embodiment, the model management server 11 may select one or a plurality of candidate model settings from the model settings S1 to SN based on the device specification P11 and the resource usage P12 of the edge computing device 121, the estimated resource usages S11 to SN1 of each of the model settings S1 to SN, and the test specification of the model inference test element 114 via the model inference deployment management element 116. Then, the model management server 11 may further select a specific model setting SS from the one or a plurality of candidate model settings.

In an embodiment, for a certain first model setting (e.g., the model setting S1) among the model settings S1 to SN, the estimated cycle time (represented by CT) in the estimated resource usage thereof includes, for example, the first processor cycle time (represented by $CT_{CPU}$) and the first image processing unit cycle time (represented by $CT_{GPU}$). In an embodiment, the CT of the first model setting is, for example, the sum of $CT_{CPU}$ and $CT_{GPU}$ of the first model setting, but the disclosure is not limited thereto.

In an embodiment, in the process of determining whether the first model setting belongs to the candidate model setting, the model inference deployment management element 116 may, for example, generate a first reference value RV1 based on the estimated resource usage of the first model setting, the device specification of the edge computing device 121, and the test specification. For example, the model inference deployment management element 116 may, for example, estimate the first reference value RV1 based on $CT_{CPU}$, $CT_{GPU}$, $Clock_{test}$, $FLOPS_{test}$, $Clock_{edge}$, and $FLOPS_{edge}$ of the first model setting. In an embodiment, the first reference value RV1 may be represented as:

$$“CT_{CPU} \times \frac{Clock_{test}}{Clock_{edge}} + CT_{GPU} \times \frac{FLOPS_{test}}{FLOPS_{edge}}”,$$

but the disclosure is not limited thereto.

In addition, the model inference deployment management element 116 may also generate a second reference value RV2 based on the production requirement RQ. For example, the model inference deployment management element 116 may estimate the second reference value RV2 based on the UPH in the production requirement RQ, the number of pictures per unit (represented by Image), and the batch information (represented by Batch) of the first model setting. In an embodiment, the second reference value RV2 may be represented as:

$$“\frac{Batch}{Image} \times \frac{3.6 \times 10^6}{UPH}”, \text{ wherein } “\frac{3.6 \times 10^6}{UPH}”$$

is the time it takes to produce a unit of product, the unit of which is, for example, milliseconds, but the disclosure is not limited thereto.

In an embodiment, the model inference deployment management element 116 may compare the first reference value RV1 to the second reference value RV2 corresponding to each of the model settings S1 to SN, in order to select one or a plurality of candidate model settings from the model settings S1 to SN. For example, the model inference deployment management element 116 may determine whether the first reference value RV1 of the first model setting (e.g., the model setting S1) is less than the second reference value RV2. In response to the first reference value RV1 being determined less than the second reference value RV2, the model inference deployment management element 116 may determine that the first model setting belongs to the candidate model setting. Moreover, in response to the first reference value RV1 being determined greater than the second reference value RV2, the model inference deployment management element 116 may determine that the first model setting does not belong to the candidate model setting.

In an embodiment of the disclosure, the model inference deployment management element 116 may evaluate whether each of the model settings S1 to SN belongs to the candidate model settings according to the above teachings.

In various embodiments, the model inference deployment management element 116 may select the specific model setting SS from the candidate model settings according to a default principle. The default principle may include a random principle or a performance principle, but the disclosure is not limited thereto. Taking the random principle as an example, the model inference deployment management element 116 may randomly select one of the candidate model settings as the specific model setting SS. Taking the performance principle as an example, the model inference deployment management element 116 may estimate the model performance with each of the candidate model settings respectively, and select one having the best performance from the candidate model settings as the specific model setting SS.

In some embodiments, the estimated model performance includes accuracy, precision, F1-score, mean average precision, recalling rate, and intersection over Union (IoU), and the like.

Then, in step S240, the model management server 11 deploys the inference model M1 configured with the specific model setting SS to the edge computing device 121.

In an embodiment, after the specific model setting SS is determined, the model inference deployment management element 116 may deploy the inference model M1 configured with the specific model setting SS to the edge computing device 121. In this way, the inference model M1 configured with the specific model setting SS may perform behaviors such as corresponding inference, preset or identification on the edge computing device 121. For example, assuming that the specific model setting SS selected by the model inference deployment management element 116 according to the above teachings is the model setting S1, the model inference deployment management element 116 may deploy the inference model M1 configured with the model setting S1 to the edge computing device 121. In this way, the inference model M1 configured with the model setting S1 may perform behaviors such as corresponding inference, preset or identification on the edge computing device 121.

In an embodiment, before the inference model M1 configured with the specific model setting SS is deployed to the edge computing device 121, the model inference deployment management element 116 may evaluate whether the edge computing device 121 may be deployed with the inference model M1 configured with the specific model setting SS based on the test specification of the model inference test element 114, and the device specification P11 and the resource usage P12 of the edge computing device 121.

In an embodiment, the model inference test element 114 may have a test memory usage (represented by $RAM_{test}$) and a test image memory usage (represented by $GRAM_{test}$) for the specific model setting SS. Accordingly, in evaluating whether edge computing device 121 may be deployed with the inference model M1 configured with the specific model setting SS, the model inference deployment management element 116 may determine whether the first sum of $RAM_{test}$ and $RAM_{used}$ of each of the reference inference models 1211 to 121M is less than $RAM_{total}$ of the edge computing device 121. That is, the model inference test element 114 may determine whether the following equation (1) holds:

$$RAM_{test} + \sum_{1 \le m \le M} RAM_{used,m} < RAM_{total} \tag{1}$$

wherein $RAM_{used,m}$ is the $RAM_{used}$ of the mth (m is the index value) reference inference model in the reference inference models 1211 to 121M.

In addition, the model inference deployment management element 116 may also determine whether the second sum of $GRAM_{test}$ and $GRAM_{used}$ of each of the reference inference models 1211 to 121M is less than $GRAM_{total}$ of the edge computing device 121. That is, the model inference test element 114 may determine whether the following equation (2) holds:

$$GRAM_{test} + \sum_{1 \le m \le M} GRAM_{used,m} < GRAM_{total} \tag{2}$$

In an embodiment, in response to the first sum being determined less than $RAM_{total}$ of the edge computing device 121 (i.e., equation (1) holds), and the second sum being determined less than $GRAM_{total}$ of the edge computing device 121 (i.e., equation (2) holds), there are sufficient computing resources on the edge computing device 121 to run the inference model M1 configured with the specific model setting SS. In this case, the model inference deployment management element 121 may determine that the edge computing device 121 can be deployed with the inference model M1 configured with the specific model setting SS. Accordingly, the model inference deployment management element 116 may deploy the inference model M1 configured with the specific model setting SS to the edge computing device 121.

Moreover, in response to equation (1) and/or equation (2) being determined not to hold, there are insufficient computing resources on the edge computing device 121 to run the inference model M1 configured with the specific model setting SS. In this case, the model inference deployment management element 116 may determine that the edge computing device 121 cannot be deployed with the inference model M1 configured with the specific model setting SS.

In this case, the model inference deployment management element 116 may control the edge computing device 121 to unload at least one of the reference inference models 1211 to 121M, and evaluate whether the edge computing device 121 may be deployed with the inference model M1 configured with the specific model setting SS (i.e., determine whether equation (1) and equation (2) hold) again. The details of the model inference deployment management element 116 evaluating whether the edge computing device 121 may be deployed with the inference model M1 configured with the specific model setting SS are as provided above, and are not repeated herein.

In an embodiment, the model inference deployment management element 116 may determine the reference inference model to be unloaded based on the idle time of each of the reference inference models 1211 to 121M. For example, the model inference deployment management element 116 may select one or a plurality of the reference inference models 1211 to 121M with the longest idle time as the reference inference model to be unloaded, and accordingly control the edge computing device 121 to unload the reference inference models to be unloaded. In an embodiment, the edge computing device 121 may correspondingly unload the reference inference models to be unloaded by removing the reference inference models to be unloaded from memory/image memory (but the models themselves remain in the edge computing device 121). Thereby, the computing resources of the edge computing device 121 may be correspondingly released, thereby making the edge computing device 121 more suitable for being deployed with the inference model M1 configured with the specific model setting SS.

In an embodiment, after a portion of the reference inference model in the edge computing device 121 is unloaded, if the model inference deployment management element 116 evaluates that the edge computing device 121 still may not be deployed with the inference model M1 configured with the specific model setting SS (i.e., it is determined that equation (1) and/or equation (2) do not hold), the model inference deployment management element 116 may again request the edge computing device 121 to unload other reference inference models to release more computing resources, but the disclosure is not limited thereto.

In some embodiments, after the inference model M1 configured with the specific model setting SS is deployed to the edge computing device 121, the inference model M1 may also be regarded as one of the reference inference models operating on the edge computing device 121. In an embodiment, the model inference deployment management element 116 may collect key model indicator information generated by each of the reference inference models on the edge computing device 121 after inference is performed. In an embodiment, the key model indicator information may be displayed on the model inference service interface 118, and the user of the model management server 11 may track the current performance status and performance of each of the reference inference models, but the disclosure is not limited thereto.

In an embodiment, the model management server 11 may obtain the production schedule of a plurality of products and find a plurality of specific inference models for producing the products from the reference inference models 1211 to 121M of the edge computing device 121. Then, the model management server 11 may control the edge computing device 121 to pre-load the above specific inference model according to the production schedule. For example, assuming that the production schedule obtained by the model management server 11 requests the edge computing device 121 to produce products A, B, and C in sequence, the model management server 11 may find a plurality of specific inference models for producing the products A, B, and C from the reference inference models 1211 to 121M. In an embodiment, assuming that the reference inference models 121M, 1211, and 1212 are used to produce the products A, B, and C, respectively, the model management server 11 may regard the reference inference models 121M, 1211, and 1212 as the above specific inference models, and request the edge computing device 121 to pre-load the reference inference models 121M, 1211, and 1212, so that the edge computing device 121 may be used to produce the products A, B, and C in sequence, but the disclosure is not limited thereto.

Figure 3:
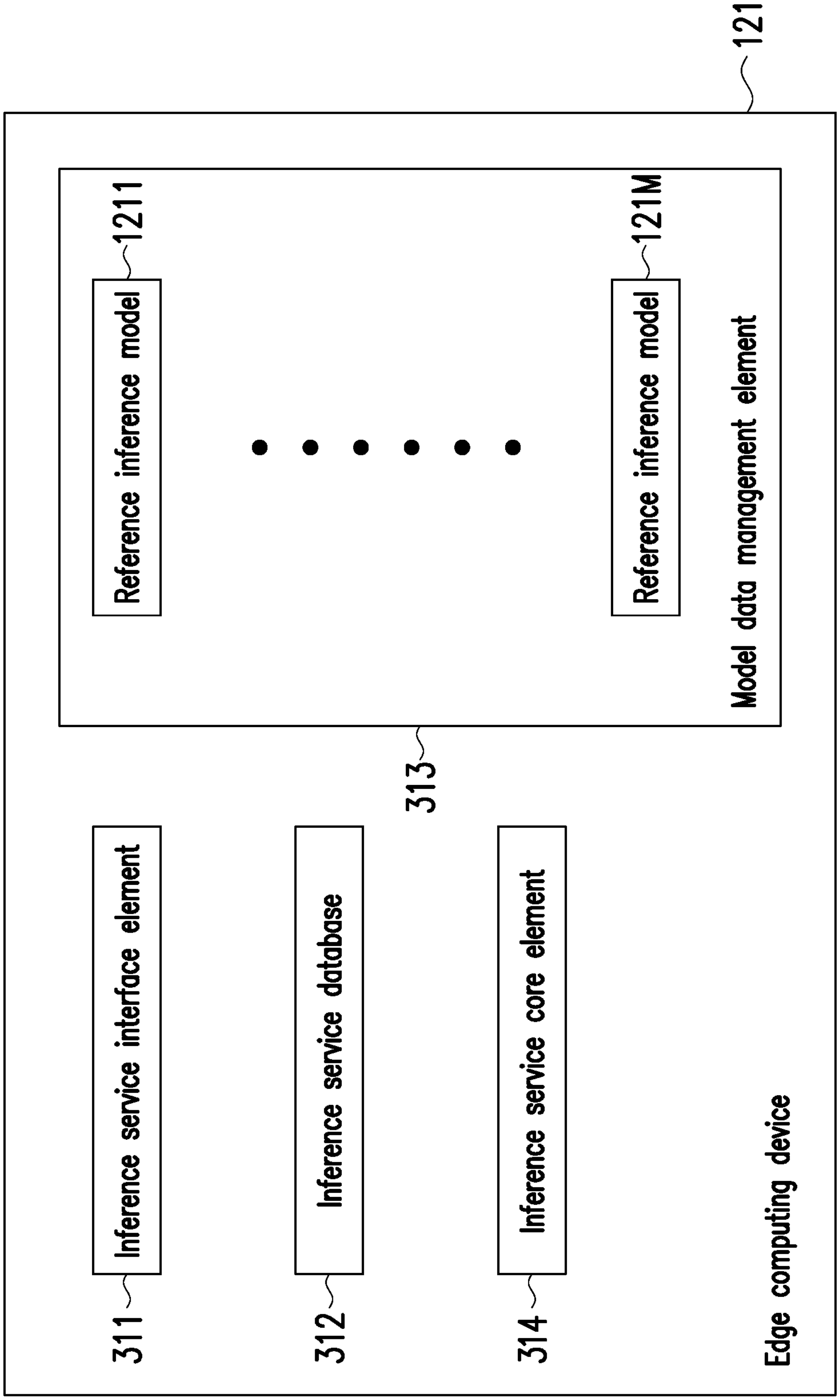
FIG. 3 is a schematic diagram of an edge computing device shown according to FIG. 1.

FIG. 3 is a schematic diagram of an edge computing device shown according to FIG. 1. In an embodiment of the disclosure, each of the considered edge computing devices 121 to 12K may have similar structures, and FIG. 3 takes the edge computing device 121 as an example for illustration, but the disclosure is not limited thereto.

In FIG. 3, the edge computing device 121 may include an inference service interface element 311, an inference service database 312, a model data management element 313, and an inference service core element 314. In an embodiment, the inference service interface element 311 may support at least one request, such as a request for the edge computing device 121 to perform operations such as inference/prediction/identification using one or a plurality of the reference inference models 1211 to 121M, but the disclosure may not be limited thereto.

In addition, the inference service database 312 may record each of the reference inference models 1211 to 121M and the usage time thereof. The model data management element 313 may be used to communicate with the model management server 11 of FIG. 1 (i.e., the model data management element 313 is communicatively coupled to the model management server 11), and may store and update the reference inference models 1211 to 121M. The inference service core element 314 may provide an inference service corresponding to the edge computing device 121 and may adaptively optimize or unload at least one of the reference inference models 1211 to 121M.

In an embodiment of the disclosure, the inference service enables the edge computing device 121 to communicate with the model management server 11, so as to cooperate with the model management server 11 to complete the technical means taught in the previous embodiments.

In some embodiments, when selecting an edge computing device for deploying the inference model M1 from the edge computing devices 121 to 12K, the model management server 11 may select one of the edge computing devices 121 to 12K having the most computing resources (e.g., the one having the most memory space) as the edge computing device to be deployed. In an embodiment, in response to the resources of the edge computing device being determined still insufficient to be deployed with the inference model M1, the model management server 11 may further unload a portion of the reference inference models on the edge computing device to free up computing resources, so that the edge computing device may be deployed with the inference model M1, but the disclosure is not limited thereto.

Based on the above, in an embodiment of the disclosure, the model management server may select a specific model setting suitable for the edge computing device from a plurality of model settings of the inference model, and the inference model configured with this specific model may be deployed to the edge computing device accordingly. Therefore, compared with the conventional manual evaluation method, the method of an embodiment of the disclosure may more accurately evaluate the inference model suitable for deployment to the edge computing device.

In some embodiments, the model management server may also adaptively request the edge computing device to unload a portion of the reference inference model to free up computing resources, thereby enabling the edge computing device to be deployed with the inference model configured with this specific model setting.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A system for deploying an inference model, suitable for deploying an inference model, the system for deploying the inference model comprising:
- an edge computing device; and
- a model management server communicatively coupled to the edge computing device, wherein the model management server is configured to:
  - obtain an estimated resource usage of each of a plurality of model settings of the inference model;
  - obtain a production requirement;
  - select one of the model settings as a specific model setting based on the production requirement, a device specification of the edge computing device, and the estimated resource usage of each of the model settings; and deploy the inference model configured with the specific model setting to the edge computing device.

2. The system for deploying the inference model of claim 1, wherein the model management server is configured to:

generate a first reference value based on the estimated resource usage of each of the model settings, the device specification of the edge computing device, and a test specification;

generate a second reference value based on the production requirement;

compare the first reference value to the second reference value, in order to select at least one candidate model setting from the model settings; and select the specific model setting from the at least one candidate model setting according to a default principle.

3. The system for deploying the inference model of claim 2, wherein the default principle comprises a performance principle, and in the performance principle, the model management server is configured to obtain an estimated model performance of each of the at least one candidate model setting, and select the specific model setting from the at least one candidate model setting according to the estimated model performance of each of the at least one candidate model setting.

4. The system for deploying the inference model of claim 1, wherein the model management server comprises:

a model training element for training the inference model; and a model inference test element for applying the trained inference model to each of the model settings to perform a pre-inference operation corresponding to each of the model settings, so as to obtain the estimated resource usage and an estimated model performance of each of the model settings.

5. The system for deploying the inference model of claim 4, wherein the model inference test element has a test specification, and the edge computing device runs a plurality of reference inference models, and the model management server further comprises:

a model inference deployment management element for:

evaluating whether the edge computing device can be deployed with the inference model configured with the specific model setting based on the test specification of the model inference test element, and the device specification and a resource usage of the edge computing device;

if yes, deploying the inference model configured with the specific model setting to the edge computing device; and if not, controlling the edge computing device to unload at least one of the reference inference models, and re-evaluating whether the edge computing device can be deployed with the inference model configured with the specific model setting.

6. The system for deploying the inference model of claim 5, wherein each of the reference inference models has an idle time, and the model inference deployment management element is configured to:

determine the at least one of the reference inference models to be unloaded based on the idle time of each of the reference inference models.

7. The system for deploying the inference model of claim 1, wherein the edge computing device runs a plurality of reference inference models, and the edge computing device comprises:

an inference service interface element for receiving at least one request;

an inference service database for recording each of the reference inference models and a usage time of each of the reference inference models;

a model data management element communicatively coupled to the model management server and configured to store and update each of the reference inference models; and an inference service core element for providing an inference service corresponding to the edge computing device and adaptively optimizing or unloading at least one of the reference inference models.

8. The system for deploying the inference model of claim 1, wherein the edge computing device is deployed with a plurality of reference inference models, and the model management server is configured to:

obtain a production schedule of a plurality of products, and find a plurality of specific inference models for producing the products from the reference inference models; and control the edge computing device to pre-load the specific inference models according to the production schedule.

9. A method for deploying an inference model, suitable for deploying an inference model to an edge computing device, the method for deploying the inference model comprising:

obtaining an estimated resource usage of each of a plurality of model settings of the inference model;

obtaining a production requirement;

selecting one of the model settings as a specific model setting based on the production requirement, a device specification of the edge computing device, and the estimated resource usage of each of the model settings; and deploying the inference model configured with the specific model setting to the edge computing device.

10. The method of claim 9, wherein the step of selecting the specific model setting comprises:

generating a first reference value based on the estimated resource usage of each of the model settings, the device specification of the edge computing device, and a test specification;

generating a second reference value based on the production requirement;

comparing the first reference value to the second reference value, in order to select at least one candidate model setting from the model settings; and selecting the specific model setting from the at least one candidate model setting according to a default principle.

11. The method for deploying the inference model of claim 10, wherein the default principle comprises a performance principle, and in the performance principle, the method for deploying the inference model further comprises:

obtaining an estimated model performance of each of the at least one candidate model setting; and selecting the specific model setting from the at least one candidate model setting according to the estimated model performance of each of the at least one candidate model setting.

12. The method for deploying the inference model of claim 9, further comprising:

training the inference model;

applying the trained inference model to each of the model settings to perform a pre-inference operation corresponding to each of the model settings, so as to obtain the estimated resource usage and an estimated model performance of each of the model settings.

13. The method for deploying the inference model of claim 12, wherein the edge computing device runs a plurality of reference inference models, and the method for deploying the inference model further comprises:

evaluating whether the edge computing device can be deployed with the inference model configured with the specific model setting based on a test specification, and the device specification and a resource usage of the edge computing device;

if yes, deploying the inference model configured with the specific model setting to the edge computing device; and if not, controlling the edge computing device to unload at least one of the reference inference models, and re-evaluating whether the edge computing device can be deployed with the inference model configured with the specific model setting.

14. The method for deploying the inference model of claim 13, wherein each of the reference inference models has an idle time, and the method comprises:

determining the at least one of the reference inference models to be unloaded based on the idle time of each of the reference inference models.

15. The method for deploying the inference model of claim 9, wherein the edge computing device is deployed with a plurality of reference inference models, and the method further comprises:

obtaining a production schedule of a plurality of products, and finding a plurality of specific inference models for producing the products from the reference inference models; and controlling the edge computing device to pre-load the specific inference models according to the production schedule.

* * * * *